United States Patent
Dalsgaard

(10) Patent No.: US 9,634,781 B2
(45) Date of Patent: Apr. 25, 2017

(54) CONCLUDING VALIDITY OF UPLINK SYNCHRONIZATION PARAMETER

(75) Inventor: Lars Dalsgaard, Oulu (FI)

(73) Assignee: NOKIA TECHNOLOGIES OY, Espoo (FI)

(*) Notice: Subject to any disclaimer, the term of this patent is extended or adjusted under 35 U.S.C. 154(b) by 2395 days.

(21) Appl. No.: 12/225,585

(22) PCT Filed: Mar. 26, 2007

(86) PCT No.: PCT/FI2007/050165
§ 371 (c)(1),
(2), (4) Date: Oct. 7, 2008

(87) PCT Pub. No.: WO2007/110483
PCT Pub. Date: Oct. 4, 2007

(65) Prior Publication Data
US 2009/0141701 A1    Jun. 4, 2009

(30) Foreign Application Priority Data

Mar. 27, 2006 (FI) ..................................... 20065197

(51) Int. Cl.
*H04J 3/06* (2006.01)
*H04B 7/26* (2006.01)
*H04W 56/00* (2009.01)

(52) U.S. Cl.
CPC .......... *H04J 3/0632* (2013.01); *H04B 7/2681* (2013.01); *H04W 56/0045* (2013.01); *H04J 3/0682* (2013.01)

(58) Field of Classification Search
CPC . H04J 3/0632; H04B 7/2681; H04W 56/0045
USPC .......................................................... 370/350
See application file for complete search history.

(56) References Cited

U.S. PATENT DOCUMENTS

| | | | |
|---|---|---|---|
| 5,722,080 A | | 2/1998 | Kondo |
| 6,006,097 A | * | 12/1999 | Hornfeldt et al. ......... 455/456.2 |
| 6,201,819 B1 | | 3/2001 | Luders |
| 6,389,285 B1 | * | 5/2002 | Escamilla ............. H04W 36/30 455/438 |

(Continued)

FOREIGN PATENT DOCUMENTS

WO    WO 01/78259 A1    10/2001

OTHER PUBLICATIONS

Indian Office Action dated Sep. 18, 2014, for corresponding Indian Application No. 8240/DELNP/2008.

(Continued)

*Primary Examiner* — Ronald B Abelson
(74) *Attorney, Agent, or Firm* — Squire Patton Boggs (US) LLP

(57) ABSTRACT

Concluding the validity of an uplink synchronization parameter, such as a timing advance, in a packet-switched radio system. The method includes: detecting (802) an uplink synchronization parameter; measuring (804) an interval from the detection of the uplink synchronization parameter; and comparing (806, 808) the measured interval with a predetermined threshold and, if the measured interval is shorter than the predetermined threshold, concluding (810) that the detected uplink synchronization parameter is still valid, or else concluding (812) that the detected uplink synchronization parameter is no more valid.

46 Claims, 5 Drawing Sheets

(56) References Cited

U.S. PATENT DOCUMENTS

| | | | | |
|---|---|---|---|---|
| 6,490,452 | B1 * | 12/2002 | Boscovic | H04W 36/30 455/436 |
| 6,931,030 | B1 | 8/2005 | Dogan | |
| 2001/0030949 | A1 * | 10/2001 | Molno et al. | 370/329 |
| 2003/0153275 | A1 * | 8/2003 | Oh et al. | 455/67.6 |
| 2004/0120302 | A1 * | 6/2004 | Sebire et al. | 370/347 |
| 2005/0175040 | A1 * | 8/2005 | Holborow | 370/509 |

OTHER PUBLICATIONS

Communication pursuant to Article 94(3) EPC mailed Aug. 7, 2013, issued in corresponding European Patent Application No. 07 730 652.0.
Communication pursuant to Article 94(3) EPC dated Mar. 27, 2015, issued in corresponding EP Patent Application No. 07 730 652.0.
European Search Report dated Jul. 24, 2013 issued in corresponding EP Patent Application No. 07730652.0.

* cited by examiner

CONCLUDING VALIDITY OF UPLINK SYNCHRONIZATION PARAMETER

FIELD

The invention relates to a network element for a packet-switched radio system, an arrangement for concluding the validity of an uplink synchronization parameter in a packet-switched radio system, user equipment for a packet-switched radio system, a node B for a packet-switched radio system, a method for concluding the validity of an uplink synchronization parameter in a packet-switched radio system, a computer program product encoding a computer program of instructions for executing a computer process for concluding the validity of an uplink synchronization parameter in a packet-switched radio system, and an integrated circuit for a network element of a packet-switched radio system.

BACKGROUND

In most radio systems, radio transmissions from individual user equipment must be synchronized when received by a node B. As user equipment may be located at various distances from the node B, the propagation delays of radio transmissions from different user equipment may vary. In order to compensate for the propagation delay, the user equipment advances its transmission time relative to its basis transmission schedule. This compensation may be achieved by a synchronization parameter such as a timing advance (TA) parameter. The node B calculates the value for the timing advance on the basis of the transmission received from the user equipment.

In packet-switched radio systems, as opposed to circuit-switched radio systems, the calculation of the timing advance is more difficult, as there is not necessarily a constant flow of traffic from the user equipment to the node B. Sometimes, signaling may be needed between the node B and the user equipment in order to restore the timing advance. In general, there is a need for a more flexible handling of the uplink synchronization parameter in modern packet-switched radio systems.

BRIEF DESCRIPTION OF THE INVENTION

The present invention seeks to provide an improved network element for a packet-switched radio system, an improved arrangement for concluding the validity of an uplink synchronization parameter in a packet-switched radio system, improved user equipment for a packet-switched radio system, an improved node B for a packet-switched radio system, an improved method for concluding the validity of an uplink synchronization parameter in a packet-switched radio system, an improved computer program product encoding a computer program of instructions for executing a computer process for concluding the validity of an uplink synchronization parameter in a packet-switched radio system, and an improved integrated circuit for a network element of a packet-switched radio system.

According to an aspect of the present invention, there is provided a network element for a packet-switched radio system, comprising: a detector detecting an uplink synchronization parameter; a time measurement unit measuring an interval from the detection of the uplink synchronization parameter by the detector; and an evaluator comparing the measured interval with a predetermined threshold and, if the measured interval is shorter than the predetermined threshold, concluding that the detected uplink synchronization parameter is still valid, or else concluding that the detected uplink synchronization parameter is no more valid.

According to an aspect of the present invention, there is provided an arrangement for concluding the validity of an uplink synchronization parameter in a packet-switched radio system, comprising: means for detecting an uplink synchronization parameter; means for measuring an interval from the detection of the uplink synchronization parameter by the means for detecting; and means for comparing the measured interval with a predetermined threshold and, if the measured interval is shorter than the predetermined threshold, concluding that the detected uplink synchronization parameter is still valid, or else concluding that the detected uplink synchronization parameter is no more valid.

According to an aspect of the present invention, there is provided user equipment for a packet-switched radio system, comprising: a detector detecting an uplink synchronization parameter; a time measurement unit measuring an interval from the detection of the uplink synchronization parameter by the detector; and an evaluator comparing the measured interval with a predetermined threshold and, if the measured interval is shorter than the predetermined threshold, concluding that the detected uplink synchronization parameter is still valid, or else concluding that the detected uplink synchronization parameter is no more valid.

According to an aspect of the present invention, there is provided a node B for a packet-switched radio system, comprising: a detector detecting an uplink synchronization parameter; a time measurement unit measuring an interval from the detection of the uplink synchronization parameter by the detector; and an evaluator comparing the measured interval with a predetermined threshold and, if the measured interval is shorter than the predetermined threshold, concluding that the detected uplink synchronization parameter is still valid, or else concluding that the detected uplink synchronization parameter is no more valid.

According to an aspect of the present invention, there is provided a method for concluding the validity of an uplink synchronization parameter in a packet-switched radio system, comprising: detecting an uplink synchronization parameter; measuring an interval from the detection of the uplink synchronization parameter; and comparing the measured interval with a predetermined threshold and, if the measured interval is shorter than the predetermined threshold, concluding that the detected uplink synchronization parameter is still valid, or else concluding that the detected uplink synchronization parameter is no more valid.

According to an aspect of the present invention, there is provided a computer program product encoding a computer program of instructions for executing a computer process for concluding the validity of an uplink synchronization parameter in a packet-switched radio system, the process comprising: detecting an uplink synchronization parameter; measuring an interval from the detection of the uplink synchronization parameter; and comparing the measured interval with a predetermined threshold and, if the measured interval is shorter than the predetermined threshold, concluding that the detected uplink synchronization parameter is still valid, or otherwise concluding that the detected uplink synchronization parameter is no more valid.

According to an aspect of the present invention, there is provided an integrated circuit for a network element of a packet-switched radio system, comprising: a detector detecting an uplink synchronization parameter; a time measurement unit measuring an interval from the detection of the uplink synchronization parameter by the detector; and an evaluator comparing the measured interval with a predetermined threshold and, if the measured interval is shorter than the predetermined threshold, concluding that the detected uplink synchronization parameter is still valid, or else concluding that the detected uplink synchronization parameter is no more valid.

The invention provides at least the advantage that the validity of the detected uplink synchronization parameter may be easily evaluated.

LIST OF DRAWINGS

Embodiments of the invention are described below by way of example and with reference to the attached drawings, in which FIG. 1 illustrates user equipment and a node B;

DESCRIPTION OF EMBODIMENTS

Figure 1:
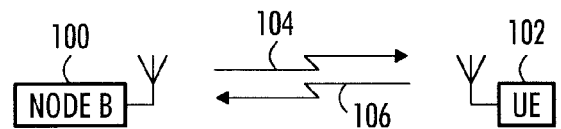

With reference to FIG. 1, examine an example of a packet-switched radio system. The radio system may be Universal Mobile Telecommunications system (UMTS), for example. The radio system may provide a high-speed packet data service. The high-speed packet data service may be a high-speed downlink packet access (HSDPA) standardized by the 3GPP ($3^{rd}$ Generation Partnership Project). The radio system may utilize a multicarrier data transmission scheme, such as Orthogonal Frequency Division Multiplexing (OFDM), for the high-speed packet data service. The radio system may include an EUTRAN (Evolved UMTS Terrestrial Radio Access Network).

FIG. 1 only shows two network elements, a node B 100 and user equipment 102, but it should be understood that a packet-switched radio system may also include other types of network elements. The number of network elements also varies depending both on the geographic coverage and on the number of users.

Throughout this application, the terms node B and user equipment are used consistently. It should be noted, however, that in some cases these network elements might also be known by other names. Node B may also be called a base station (BS) or a base transceiver station (BTS), for example. User equipment may also be called a mobile station (MS) or a subscriber terminal, for example. The basic difference between the two network elements is that the node B belongs to the network infrastructure, whereas the user equipment belongs to the user of the system. As the general structure of the radio system as well as the structures and functions of the network elements are well known in the art, they will not be further described here, but the reader is advised to consult numerous text-books and standards of the wireless telecommunications.

FIG. 1 illustrates the concepts of uplink (UL) and downlink (DL). Downlink 104 refers to the radio connection from the node B 100 to the user equipment 102, whereas uplink 106 refers to the radio connection from the user equipment 102 to the node B 100. As was explained earlier, the node B 100 calculates the uplink synchronization parameter on the basis of the received uplink radio connection 106. The node B 100 signals the value of the uplink synchronization parameter to the user equipment 102 in the downlink radio connection 104.

Generally speaking, there is a network element in the radio system of FIG. 1 comprising the following three parts: 1) a detector detecting an uplink 106 synchronization parameter, 2) a time measurement unit measuring an interval from the detection of the uplink 106 synchronization parameter by the detector, and 3) an evaluator comparing the measured interval with a predetermined threshold and, if the measured interval is shorter than the predetermined threshold, concluding that the detected uplink 106 synchronization parameter is still valid, or else concluding that the detected uplink 106 synchronization parameter is no more valid. This special network element may be the node B 100 and/or the user equipment 102.

The detector, the time measurement unit and the evaluator may be implemented as software running in one or more processors, or as one or more integrated circuits, such as application-specific integrated circuits ASIC. Other hardware embodiments are also feasible, such as a circuit built of separate logic components. A hybrid of these different implementations is also feasible. When deciding the implementation manner, a person skilled in the art will consider the requirements set for the size and power consumption, necessary processing capacity, production costs, and production volumes, for example.

Figure 2:
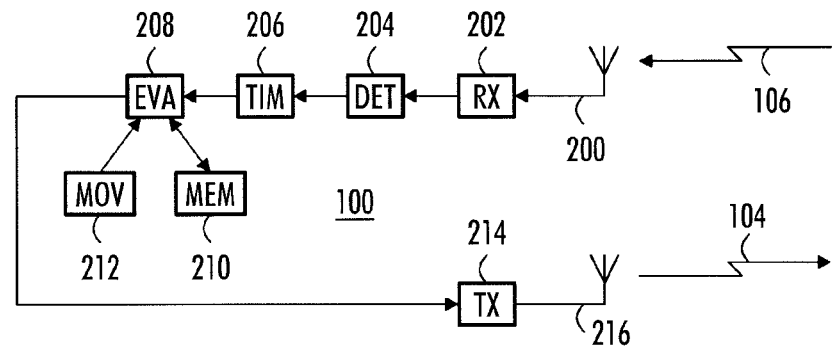
FIG. 2 illustrates an embodiment of the node B.

Referring to FIG. 2, let us first study the case where the special network element is the node B 100.

The node B 100 comprises a receiver 202 with an antenna 200 receiving the uplink 106. The detector 204 detects the uplink 106 synchronization parameter. This may be achieved by calculating the timing advance on the basis of the received uplink 106 radio transmission from the user equipment 102, for example. The calculation of timing advance may be performed by any prior art way.

The node B 100 also comprises a time measurement unit 206 measuring an interval from the detection of the uplink 106 synchronization parameter by the detector 204. The time measurement unit 206 may measure the interval from the detection of the uplink 106 synchronization parameter until conclusion of the validity of the uplink 106 synchronization parameter. The time measurement unit 206 may be implemented in prior art ways. A timer may be used to measure the interval. A clock may be used to time stamp the detection and the evaluation and the interval may then be calculated from the two time stamps. Another natural way to measure time in the radio system is to use a system specific time, expressed by a frame number or another quantity relating to the frame structure of the radio interface.

The node B 100 also comprises an evaluator 208 comparing the measured interval with a predetermined threshold and, if the measured interval is shorter than the predetermined threshold, concluding that the detected uplink 106 synchronization parameter is still valid, or else concluding that the detected uplink 106 synchronization parameter is no more valid.

The evaluator 208 may adjust the predetermined threshold on the basis of an estimated movement of the user equipment 102 of the uplink 106. The network infrastructure of the radio system may include a unit 212 estimating the movement of the user equipment 102. If the user equipment 102 does not move, then the predetermined threshold may be lengthened. On the other hand, if the user equipment 102 is going away from the node B 100 or approaching the node B 100, the predetermined threshold may be shortened. If the speed of the user equipment 102 may be estimated, the predetermined threshold may be adjusted even more precisely.

The node B 100 may also comprise a memory 210 storing history information on changes in the uplink 106 synchronization parameter. The evaluator 208 may adjust the predetermined threshold on the basis of the history information. If the uplink 106 synchronization parameter has not changed during the last ten minutes, for example, it may be safe to lengthen the predetermined threshold.

The node B may also comprise a transmitter 214 transmitting downlink 104 the decided validity via an antenna 216. The purpose of this downlink 104 transmission is to inform the user equipment 102 of the validity of its uplink 106 synchronization parameter. Besides the validity, also the (possibly updated) value of the uplink 106 synchronization parameter may be transmitted downlink 104. Although separate antennas 200, 216 are shown in FIG. 2, there may exist only a single antenna coupled through a duplexer both to the receiver 202 and the transmitter 214.

Figure 3:
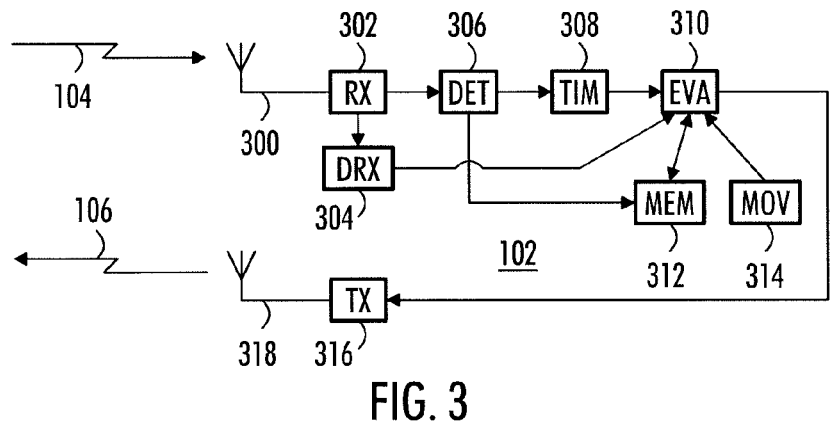
FIG. 3 illustrates an embodiment of the user equipment.

Referring to FIG. 3, let us then study a case where the special network element is the user equipment 102.

The user equipment 102 comprises a receiver 302 with an antenna 300 receiving the downlink 104. The receiver 302 may receive downlink 104 signaling comprising the uplink synchronization parameter.

The detector 306 detects the uplink 106 synchronization parameter from the received downlink 104 transmission. The signaling of the uplink 106 synchronization parameter needs to be done at least in the beginning of the radio connection. After this, the user equipment 102 may detect the uplink 106 synchronization parameter so that the node B 100 may indicate that the (previous) uplink 102 synchronization parameter is still valid.

The user equipment 102 also comprises a time measurement unit 308 measuring an interval from the detection of the uplink 106 synchronization parameter by the detector 306. The time measurement unit 308 of the user equipment 102 may be implemented in a similar way as the time measurement unit 206 of the node B 100. The time measurement unit 308 may also function as follows: the interval measurement is started when the uplink 106 synchronization parameter is received, and whenever a new valid uplink 106 synchronization parameter or information indicating the uplink 106 synchronization parameter being valid is received from the node B 100, the interval measurement is re-started, and the measured interval is used in the evaluation of the validity before any uplink 106 transmission.

The user equipment 102 also comprises an evaluator 310 comparing the measured interval with a predetermined threshold and, if the measured interval is shorter than the predetermined threshold, concluding that the detected uplink 106 synchronization parameter is still valid, or else concluding that the detected uplink 106 synchronization parameter is no more valid.

The receiver 302 may also receive downlink 104 signaling comprising the predetermined threshold. The evaluator 310 may adjust the predetermined threshold on the basis of an estimated movement of the user equipment 102 of the uplink 106. The estimated movement may be determined by the network infrastructure and it may be signaled from the node B 100 to the user equipment 102. Alternatively, the user equipment 102 may comprise a unit 314 estimating the movement, for example with a positioning system such as the GPS (Global Positioning System).

The user equipment 102 may also comprise a memory 312 storing history information on the uplink 106 synchronization parameter changing. The evaluator 310 may adjust the predetermined threshold on the basis of the history information.

The receiver 302 of the user equipment 102 may operate in a discontinuous reception mode (sometimes known by the acronym DRX). The evaluator 208 may be configured to operate after the discontinuous operation mode of the receiver 302 ends.

Figure 4:
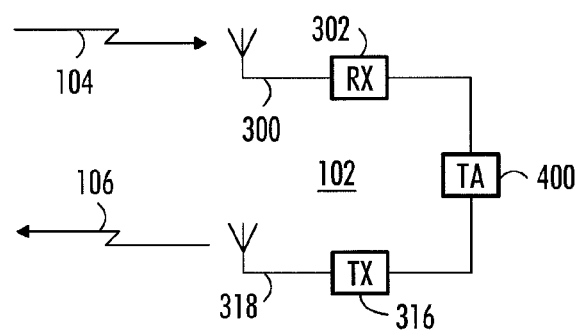
FIG. 4 illustrates another embodiment of the user equipment.

As was explained earlier, the special network element may be the node B 100 and/or the user equipment 102. If the needed functionality is implemented in the node B 100, the structure of the user equipment 102 may be simplified as shown in FIG. 4: the user equipment 102 comprises the receiver 302 with its antenna 302, a unit 400 receiving the uplink 106 synchronization parameter and utilizing it in the transmission, and the transmitter 316 with its antenna 318. Antennas 300 and 318, in FIGS. 3 and 4, may be replaced by a single antenna coupled through a duplexer both with the receiver 302 and the transmitter 316.

Similarly, if the needed functionality is implemented in the user equipment 102, the structure of the node B 100 may be simplified so that a unit calculating the uplink 106 synchronization parameter and signaling it to the user equipment 102 is needed, besides the receiver 202, the transmitter 214 and the antenna(s) 200, 216.

Figure 5:
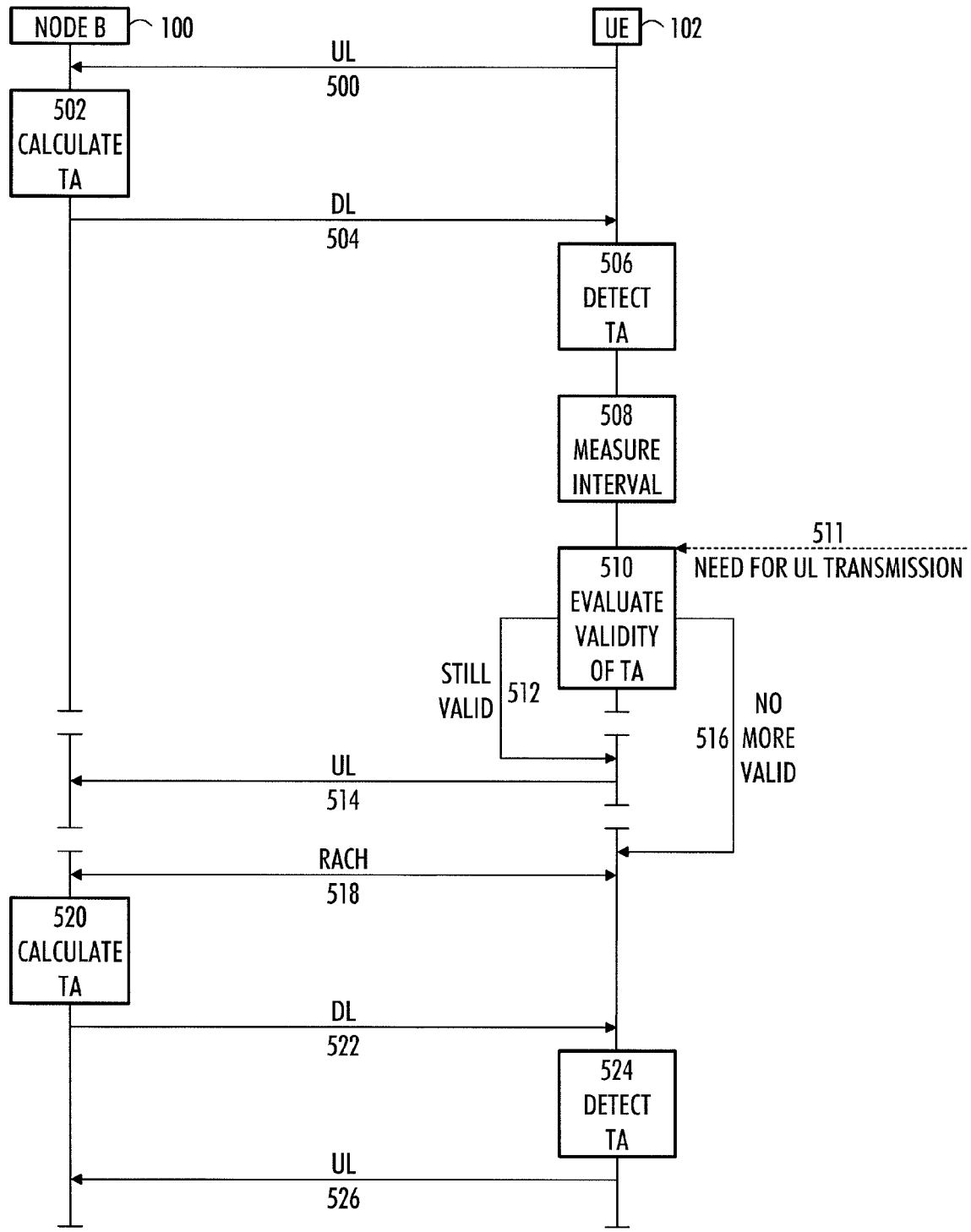
FIG. 5 illustrates a signal sequence between the node B and the user equipment.
Figure 6:
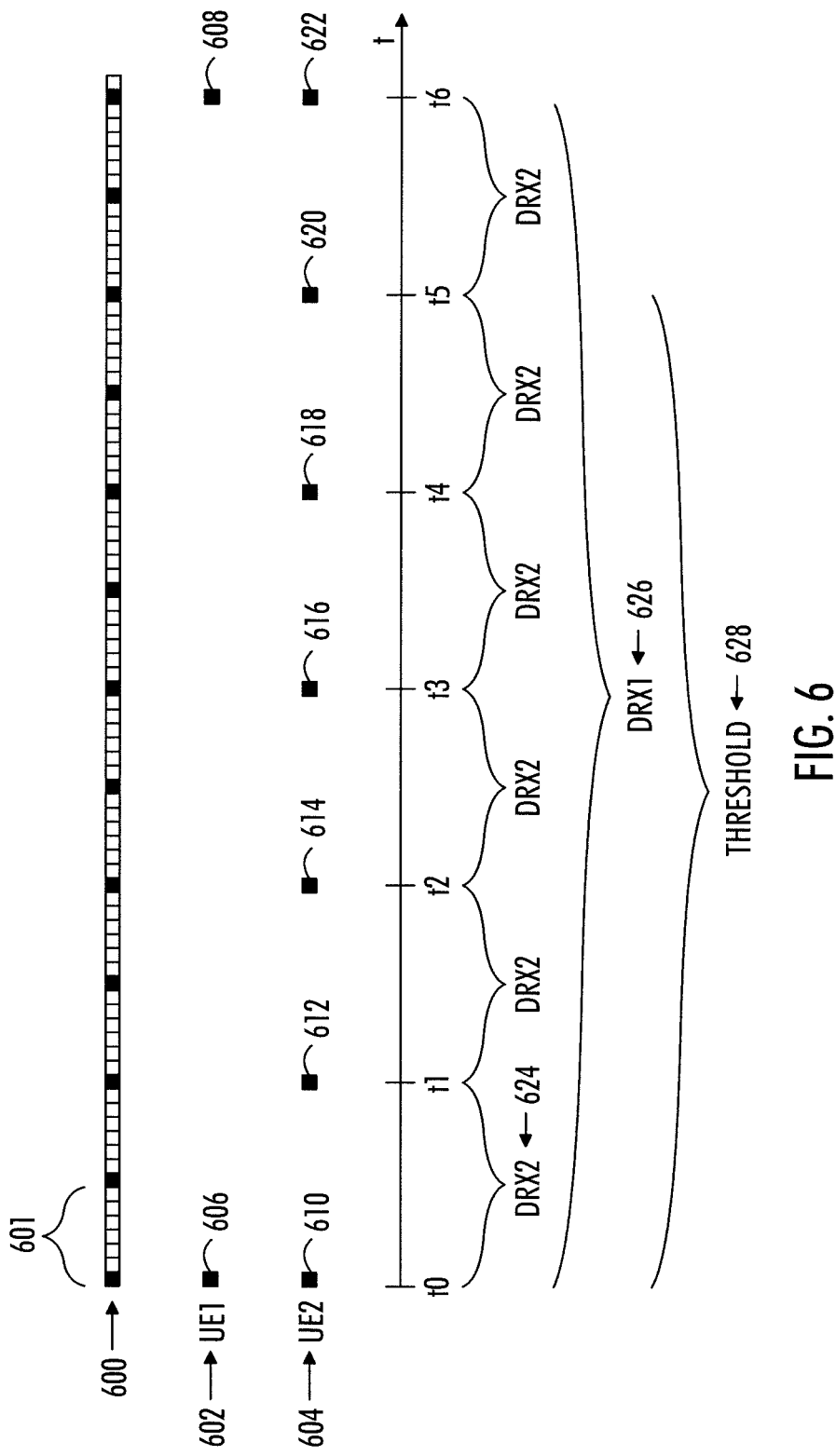
FIG. 6 illustrates a predetermined threshold and discontinuous reception intervals.
Figure 7:
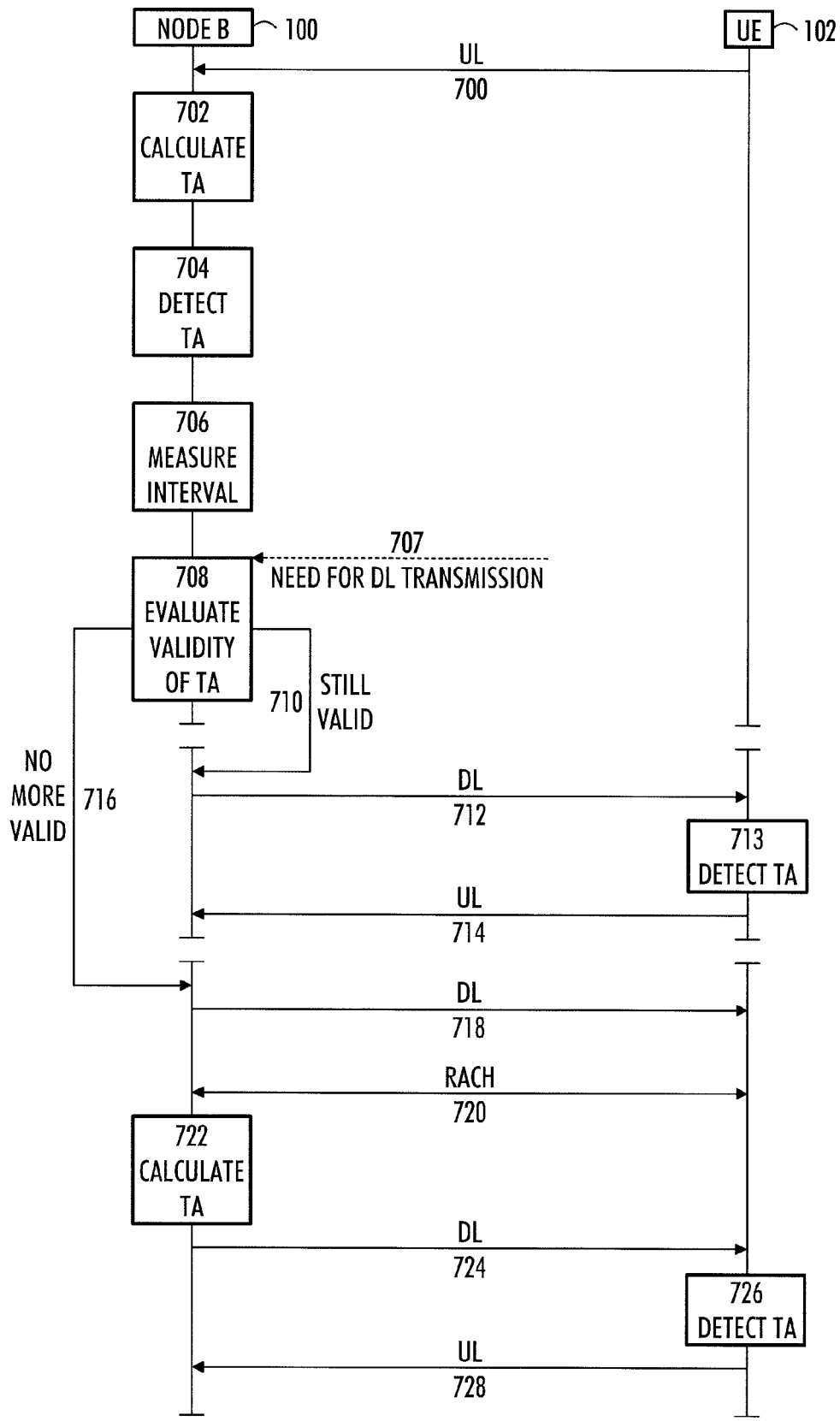
FIG. 7 illustrates another signal sequence between the node B and the user equipment.

In order to further clarify the processing of the uplink 106 synchronization parameter, two signal sequences between the node B 100 and the user equipment 102 are explained, first with reference to FIG. 5 and then with reference to FIG. 7. After that the concepts of a predetermined threshold and discontinuous reception intervals are explained with reference to FIG. 6.

In FIG. 5, the functionality of the special network element is implemented in the user equipment 102.

The node B 100 calculates 502 the timing advance on the basis of the uplink transmission 500 received from the user equipment 102. Next, the node B 100 transmits 504 the timing advance parameter in downlink transmission to the user equipment 102.

The user equipment 102 detects 506 the timing advance parameter from the downlink transmission 504. Next, the user equipment 102 starts to measure the interval 508. When a need for uplink transmission arises 511, the validity of the timing advance parameter is evaluated 510 as explained above: the measured interval is compared with a predetermined threshold and, if the measured interval is shorter than the predetermined threshold, it is concluded 512 that the detected timing advance parameter is still valid, or else it is concluded 516 that the detected timing advance parameter is no more valid. The measurement of the interval may be stopped when the validity is checked, or the measurement may continue. The measurement may continue until the next detection of the uplink 106 synchronization parameter, for example.

If the conclusion was that the detected timing advance parameter is still valid 512, the user equipment 102 may transmit 514 normally in the uplink using the detected timing advance parameter (provided, of course, that there are radio channel resources reserved for the uplink 106 transmission). The signal sequence may then continue from operation 502.

If the conclusion was that the detected timing advance parameter is no more valid 516, the user equipment 102 needs to acquire a new synchronization with a RACH (Random Access Channel) procedure 518, for example. The node B 100 then calculates 520 a new value for the timing advance parameter on the basis of the RACH procedure 518 and transmits 522 the new timing advance parameter in the downlink to the user equipment 102. The user equipment 102 detects 524 the timing advance parameter and transmits 526 in the uplink utilizing the detected timing advance parameter. The signal sequence may then continue from 508 and/or 502.

Next, FIG. 7 is explained: the functionality of the special network element is implemented in the node B 100.

The node B 100 calculates 702 the timing advance on the basis of the received uplink transmission 700 from the user equipment 102. Hence, the timing advance is detected 704 in the node B 100. After that, the node B 100 starts to measure 706 the interval. After this, the validity of the timing advance parameter is evaluated 708: the measured interval is compared with a predetermined threshold and, if the measured interval is shorter than the predetermined threshold, it is concluded 710 that the detected timing advance parameter is still valid, or else it is concluded 716 that the detected timing advance parameter is no more valid.

If the conclusion was that the detected timing advance parameter is still valid 710, the node B 100 may transmit 712 in the downlink, the transmission including an indication that the timing advance parameter is still valid. The user equipment 102 may detect 713 the timing advance parameter from the downlink 712, and use the detected timing advance parameter in the next uplink transmission 714. The signal sequence may then continue from operation 702.

If the conclusion was that the detected timing advance parameter is no more valid 716, the user equipment 102 may be informed accordingly in the downlink transmission 718. The user equipment needs to acquire a new synchronization with a RACH (Random Access Channel) procedure 720, for example. The node B 100 then calculates 722 a new value for the timing advance parameter on the basis of the RACH procedure 720 and transmits 724 the new timing advance parameter in the downlink to the user equipment 102. The user equipment 102 detects 726 the timing advance parameter and transmits 728 in the uplink utilizing the detected timing advance parameter. The signal sequence may then continue from 702.

In FIG. 7, the node B 100 calculates 702 the timing advance on the basis of the received uplink transmission 700. An alternative way to start the signal sequence of FIG. 7 is such that the node B 100 realizes 707 a need to transmit data in downlink. Next, the node B 100 evaluates 708 the validity of the timing advance parameter (that has been calculated on the basis of some earlier uplink transmission), and from there on the sequence continues as described in FIG. 7.

Next, FIG. 6 is explained.

In the EUTRAN (Evolved UMTS Terrestrial Radio Access Network) transmission is packet-based and the concept of dedicated (continuous uplink/downlink resource assignment) connections does not exist. EUTRAN resource assignments may be given mostly through one-time allocations using an allocation table (AT). The user equipment 102 may receive the allocation table in an active state at specified time intervals (DRX intervals). The current view is that the length of the DRX (Discontinuous Reception) interval may vary: it may be rather long due to requirements on optimized power saving capabilities in the active state. The procedure for concluding the validity of the uplink 106 synchronization parameter is described in connection with the active state, but it need not be restricted to that state only.

At DRX timeout the user equipment 102 may wake up and receive the allocation table, from which the user equipment 102 may check whether there are any resources allocated for it. A current estimate is that the DRX intervals in the active state may vary from 0 to 5.12 seconds. In addition to this, the common understanding in 3GPP is that the power saving possibilities in 3.9 G should be somehow similar both in an idle state and in an active state.

One problem related to the packet-only connections is the matter of keeping the uplink 106 synchronization up-to-date while not having an active uplink/downlink transmission. On the other hand, if the user equipment 102 is not uplink-synchronized and the DRX period is (very) short (e.g. 50 milliseconds), it may introduce significant uplink RACH signaling overhead (needed due to missing uplink synchronization) and uplink data transmission delay due to the RACH procedure each time the user equipment 102 is assigned resources in the allocation table for the uplink 106.

If the uplink 106 synchronization is mandated to be kept up-to-date at all times while in the 3.9 G active state, this may, on the other hand, introduce a very limited possibility for power optimization in the active state and significantly increase active/idle state transitions.

Above reasoning is based on the fact that uplink 106 synchronization of the user equipment 102 may only be regarded valid for a limited amount of time. If the uplink 106 synchronization needs to be kept up-to-date for a longer period, there needs to be both uplink 106 and downlink 104 transmission between the user equipment 102 and the node B 100. The other option is to command the user equipment 102 into the idle state when the DRX period is longer than the interval during which the user equipment 102 is able to keep the uplink 106 synchronization up-to-date.

The above-listed problems of the uplink 106 synchronization concern the validity of the uplink 106 synchronization parameter. In general, if the measured interval between consecutive uplink 106 and downlink 104 transmissions is shorter than the predetermined threshold, the uplink 106 synchronization parameter is regarded as valid. In other words, if the measured interval from the latest possible update possibility of the uplink 106 synchronization parameter is shorter than the predetermined threshold, the uplink 106 synchronization parameter is regarded as valid.

The DRX period and the uplink 106 synchronization may be linked in such a way that if the DRX period of the user equipment 102 is shorter than the predetermined threshold, the user equipment 102 shall regard its uplink 106 synchronization up-to-date while in the active state.

The network may assure that the user equipment 102 gets uplink 106 and downlink 104 resources assigned at suitable intervals assuring that the network can estimate the timing advance parameter. The suitable interval may be a network parameter or it may be stated in a specification.

Parameters having an impact on the updating frequency are in general parameters that may change the signal path between the user equipment 102 and the node B 100. Such parameters include the speed of the user equipment 102 relative to the node B 100, movement of the user equipment 100 in general, and changes in the surrounding environment.

As most of above parameters are difficult to relate directly to the timing advance parameter of the user equipment 102, one solution is to update the timing advance based on intervals which are short enough to guarantee that the timing advance parameter will not change significantly within that interval. As an alternative solution the network may use the connection properties as a basis for requesting the user equipment 102 to consider the uplink synchronization 106 parameter as valid.

This feature could be implemented in several ways. A 3.9 G specification may state that if the user equipment 102 is in the active state and the DRX period is shorter than a predetermined threshold, the network shall assign the necessary uplink 106 and downlink 104 resources to the user equipment 102 for making it possible for the network to keep the user equipment 102 uplink 106 synchronization up-to-date. This feature may be supported by a network setting given through the system information either on a cell-to-cell basis or even as network wide parameters. Signaling may be used to inform the user equipment 102 that the feature is used. Such signaling could take place during connection setup, for example.

The algorithm may take the following form:

if DRX period>predetermined threshold: No need to consider the uplink 106 synchronization parameter as valid in the active state; and if DRX period<=predetermined threshold: the uplink 106 synchronization parameter shall be considered as valid in the active state.

The predetermined threshold could be given as DRX periods in sub-frames or milliseconds or by other means (as a bit pattern).

The predetermined threshold may be given the following special reserved values: '0'=never use the feature in an active state, and 'infinity'=always use this feature in an active state.

This feature may assure that support for power optimizations is provided also in the active mode and that user equipment 102 may consider its uplink 106 synchronization parameter as valid during the defined situations. The uplink 106 synchronization of the user equipment 102 may be both predictable and configurable by the network. In addition, the amount of resources needed for the RACH procedure may be less, and the uplink 106 access time may be shorter.

An exemplary frame structure 600 is described in FIG. 6. The frame structure 600 comprises sub-frames 601.

The first user equipment 602 may receive downlink at times t0 and t6, separated by the first DRX period 626.

The second user equipment 604 may receive downlink at times t0, t1, t2, t3, t4, t5 and t6, separated by the second DRX period 624.

The channel resources 606, 608, 610, 612, 614, 616, 618, 620 and 622 include downlink 104 channel resources and uplink 106 channel resources. For purposes of illustration, the details of the assigned resources need not be described here.

The predetermined threshold 628 is clearly longer than the second DRX period 624, yet clearly shorter than the first DRX period 626. The conclusion is that the timing advance parameter of the second user equipment 604 is no more valid at time t6, but the timing advance parameter of the first user equipment 602 is still valid at times t1, t2, t3, t4, t5 and t6.

Figure 8:
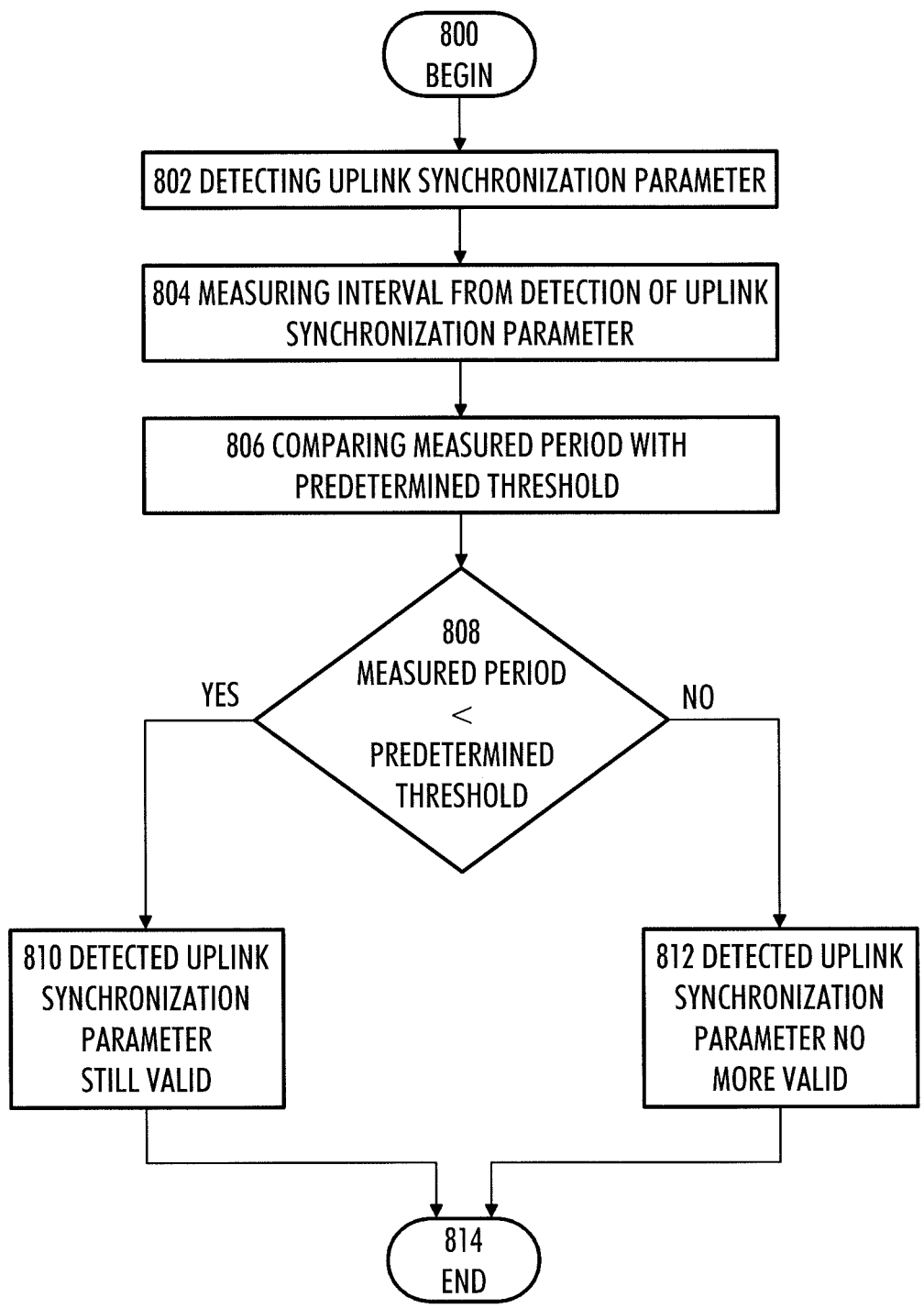
FIG. 8 illustrates an embodiment of a method for concluding the validity of an uplink synchronization parameter in a packet-switched radio system.

Next, with reference to FIG. 8, a method for concluding the validity of an uplink synchronization parameter in a packet-switched radio system is explained. The method begins in 800. In 802, an uplink synchronization parameter is detected. Next, an interval from the detection of the uplink synchronization parameter is measured in 804. Next, the measured interval is compared 806, 808 with a predetermined threshold: if the measured interval is shorter than the predetermined threshold, it is concluded 810 that the detected uplink synchronization parameter is still valid, or else it is concluded 812 that the detected uplink synchronization parameter is no more valid. After the conclusion, the method is either ended in 814, or continued from 802.

The method may be implemented by the node B 100 and/or the user equipment 102 as explained above, for example.

The method may be implemented as a computer program product encoding a computer program of instructions for executing a computer process for concluding the validity of an uplink synchronization parameter in a packet-switched radio system. The computer program product may be embodied in a distribution medium. The distribution medium may be any means for distributing software to customers, such as a program storage medium, a memory, a software distribution package, a signal, or a telecommunications signal. The computer program product may be run on the node B 100 and/or the user equipment 102.

Even though the invention has been described above with reference to an example according to the accompanying drawings, it is clear that the invention is not restricted thereto but it can be modified in several ways within the scope of the appended claims.

The invention claimed is:

1. An apparatus, comprising:
a processor; and
a memory including computer program code,
the memory and the computer program code configured to, with the processor, cause the apparatus at least to
receive downlink signaling comprising an uplink synchronization parameter;
detect the uplink synchronization parameter;
measure an interval from the detection of the uplink synchronization parameter; and
compare the measured interval with a predetermined threshold and, if the measured interval is shorter than the predetermined threshold, conclude that the detected uplink synchronization parameter is still valid, or else conclude that the detected uplink synchronization parameter is no more valid.

2. The apparatus of claim 1, wherein the uplink synchronization parameter comprises a timing advance parameter.

3. The apparatus of claim 1, wherein the memory and the computer program code are further configured to, with the processor, cause the apparatus at least to adjust the predetermined threshold on the basis of an estimated movement of user equipment of the uplink.

4. The apparatus of claim 1, wherein the memory and the computer program code are further configured to, with the processor, cause the apparatus at least to store history information on changes in the uplink synchronization parameter, and adjust the predetermined threshold on the basis of the history information.

5. The apparatus of claim 1, wherein the apparatus comprises user equipment.

6. The apparatus of claim 1, wherein the receiver also receives downlink signaling comprising the predetermined threshold.

7. The apparatus of claim 1, wherein the receiver operates in a discontinuous reception mode, and the evaluator operates after the discontinuous operation mode ends.

8. The apparatus of claim 1, wherein the apparatus comprises a node B.

9. The apparatus of claim 8, further comprising a transmitter transmitting downlink the decided validity.

10. An arrangement comprising:
means for receiving downlink signaling comprising an uplink synchronization parameter;

means for detecting the uplink synchronization parameter;

means for measuring an interval from the detection of the uplink synchronization parameter by the means for detecting; and means for comparing the measured interval with a predetermined threshold and, if the measured interval is shorter than the predetermined threshold, concluding that the detected uplink synchronization parameter is still valid, or else concluding that the detected uplink synchronization parameter is no more valid.

11. The arrangement of claim 10, wherein the uplink synchronization parameter comprises a timing advance parameter.

12. The arrangement of claim 10, wherein the means for comparing adjusts the predetermined threshold on the basis of an estimated movement of user equipment of the uplink.

13. The arrangement of claim 10, further comprising means for storing history information on the uplink synchronization parameter changing, the means for comparing adjusting the predetermined threshold on the basis of the history information.

14. The arrangement of claim 10, wherein the means for receiving also receives downlink signaling comprising the predetermined threshold.

15. The arrangement of claim 10, wherein the means for receiving operates in a discontinuous reception mode, and the means for comparing operates after the discontinuous operation mode ends.

16. The arrangement of claim 10, further comprising means for transmitting downlink the decided validity.

17. A user equipment comprising:

a receiver configured to receive downlink signaling comprising an uplink synchronization parameter;

a detector configured to detect the uplink synchronization parameter;

a time measurement unit configured to measure an interval from the detection of the uplink synchronization parameter by the detector; and an evaluator configured to compare the measured interval with a predetermined threshold and, if the measured interval is shorter than the predetermined threshold, concluding that the detected uplink synchronization parameter is still valid, or else concluding that the detected uplink synchronization parameter is no more valid.

18. The user equipment of claim 17, wherein the uplink synchronization parameter comprises a timing advance parameter.

19. The user equipment of claim 17, wherein the evaluator adjusts the predetermined threshold on the basis of an estimated movement of the user equipment of the uplink.

20. The user equipment of claim 17, further comprising a memory configured to store history information on changes in the uplink synchronization parameter, the evaluator configured to adjust the predetermined threshold on the basis of the history information.

21. The user equipment of claim 17, wherein the receiver is also configured to receive downlink signaling comprising the predetermined threshold.

22. The user equipment of claim 17, wherein the receiver operates in a discontinuous reception mode, and the evaluator operates after the discontinuous operation mode ends.

23. A node B comprising:

a receiver configured to receive downlink signaling comprising an uplink synchronization parameter;

a detector configured to detect an uplink synchronization parameter;

a time measurement unit configured to measure an interval from the detection of the uplink synchronization parameter by the detector; and an evaluator configured to compare the measured interval with a predetermined threshold and, if the measured interval is shorter than the predetermined threshold, concluding that the detected uplink synchronization parameter is still valid, or else concluding that the detected uplink synchronization parameter is no more valid.

24. The node B of claim 23, wherein the uplink synchronization parameter comprises a timing advance parameter.

25. The node B of claim 23, wherein the evaluator adjusts the predetermined threshold on the basis of an estimated movement of user equipment of the uplink.

26. The node B of claim 23, further comprising a memory configured to store history information on changes in the uplink synchronization parameter, the evaluator configured to adjust the predetermined threshold on the basis of the history information.

27. The node B of claim 23, further comprising a transmitter configured to transmit downlink the decided validity.

28. A method comprising:

receiving downlink signaling comprising a predetermined threshold;

detecting an uplink synchronization parameter;

measuring an interval from the detection of the uplink synchronization parameter; and comparing the measured interval with the predetermined threshold and, if the measured interval is shorter than the predetermined threshold, concluding that the detected uplink synchronization parameter is still valid, or else concluding that the detected uplink synchronization parameter is no more valid.

29. The method of claim 28, wherein the uplink synchronization parameter comprises a timing advance parameter.

30. The method of claim 28, further comprising: adjusting the predetermined threshold on the basis of an estimated movement of user equipment of the uplink.

31. The method of claim 28, further comprising: storing history information on changes in the uplink synchronization parameter; and adjusting the predetermined threshold on the basis of the history information.

32. The method of claim 28, further comprising: receiving downlink signaling comprising the uplink synchronization parameter.

33. The method of claim 28, wherein the validity is decided after a discontinuous operation mode of user equipment of the uplink ends.

34. The method of claim 28, further comprising: transmitting downlink the decided validity.

35. A computer program product embodied in a distribution medium and encoding a computer program of instructions for executing a computer process, the process comprising:

receiving downlink signaling comprising an uplink synchronization parameter;

detecting the uplink synchronization parameter;

measuring an interval from the detection of the uplink synchronization parameter; and comparing the measured interval with a predetermined threshold and, if the measured interval is shorter than the predetermined threshold, concluding that the detected uplink synchronization parameter is still valid, or otherwise concluding that the detected uplink synchronization parameter is no more valid.

36. The computer program product of claim 35, wherein the uplink synchronization parameter comprises a timing advance parameter.

37. The computer program product of claim 35, further comprising: adjusting the predetermined threshold on the basis of an estimated movement of user equipment of the uplink.

38. The computer program product of claim 35, further comprising: storing history information on changes in the uplink synchronization parameter; and adjusting the predetermined threshold on the basis of the history information.

39. The computer program product of claim 35, further comprising: receiving downlink signaling comprising the predetermined threshold.

40. The computer program product of claim 35, wherein the validity is decided after a discontinuous operation mode of user equipment of the uplink ends.

41. The computer program product of claim 35, further comprising: transmitting the decided validity downlink.

42. An integrated circuit comprising:
  a receiver configured to receive downlink signaling comprising an uplink synchronization parameter;
  a detector configured to detect the uplink synchronization parameter;
  a time measurement unit configured to measure an interval from the detection of the uplink synchronization parameter by the detector; and
  an evaluator configured to compare the measured interval with a predetermined threshold and, if the measured interval is shorter than the predetermined threshold, concluding that the detected uplink synchronization parameter is still valid, or else concluding that the detected uplink synchronization parameter is no more valid.

43. The integrated circuit of claim 42, wherein the uplink synchronization parameter comprises a timing advance parameter.

44. The integrated circuit of claim 42, wherein the evaluator adjusts the predetermined threshold on the basis of an estimated movement of user equipment of the uplink.

45. The integrated circuit of claim 42, further comprising a memory configured to store history information on changes in the uplink synchronization parameter, and the evaluator adjusts the predetermined threshold on the basis of the history information.

46. A processor comprising:
  a receiver configured to receive downlink signaling comprising an uplink synchronization parameter;
  a detector configured to detect the uplink synchronization parameter;
  a time measurement unit configured to measure an interval from the detection of the uplink synchronization parameter by the detector; and
  an evaluator configured to compare the measured interval with a predetermined threshold and, if the measured interval is shorter than the predetermined threshold, concluding that the detected uplink synchronization parameter is still valid, or else concluding that the detected uplink synchronization parameter is no more valid.

* * * * *